(No Model.)
G. W. RUSSELL.
FLY TRAP.
No. 402,977. Patented May 7, 1889.
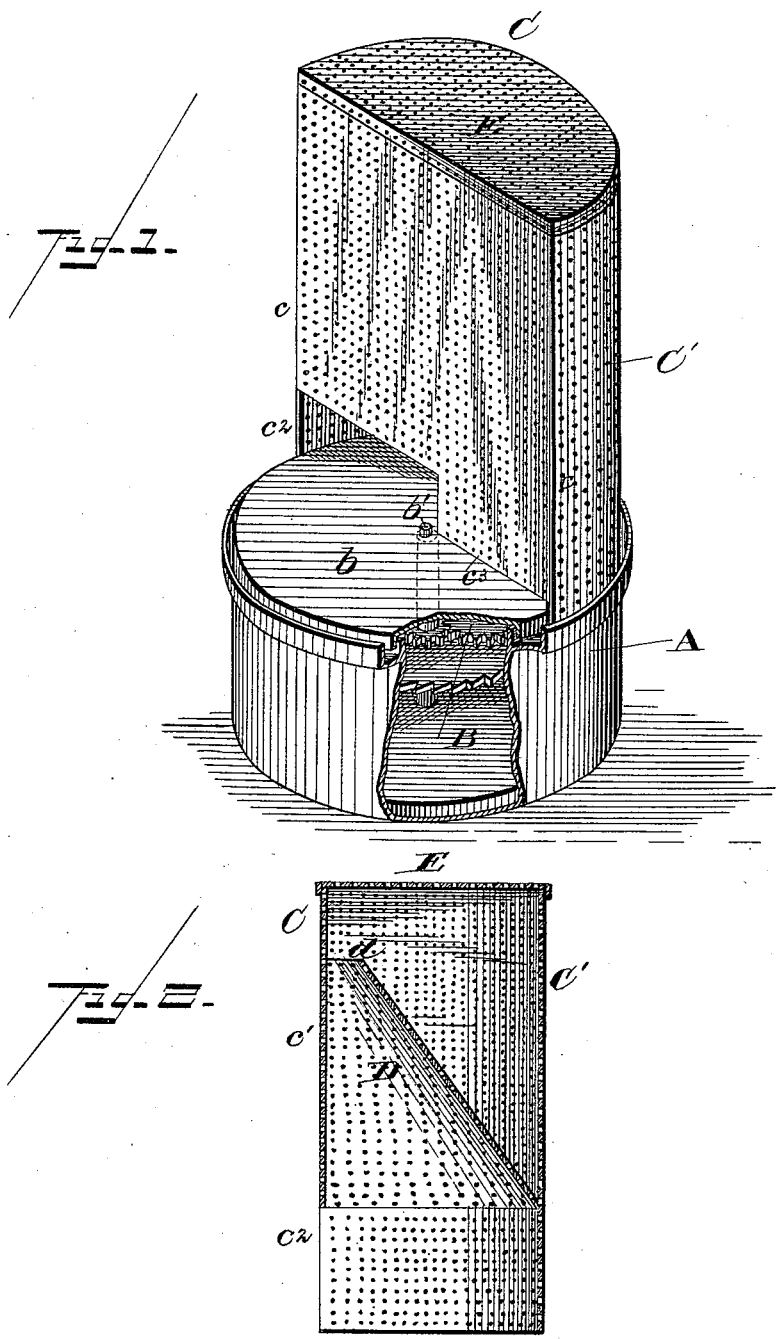
WITNESSES,
F. L. Ourand
R. W. Elliott
INVENTOR,
George W. Russell,
by J. Louis Bagger & Co.
Attorney

UNITED STATES PATENT OFFICE.

GEORGE WASHINGTON RUSSELL, OF MOBEETIE, TEXAS.

FLY-TRAP.

SPECIFICATION forming part of Letters Patent No. 402,977, dated May 7, 1889.

Application filed December 22, 1888. Serial No. 294,361. (No model.)

*To all whom it may concern:*

Be it known that I, GEORGE WASHINGTON RUSSELL, a citizen of the United States, and a resident of Mobeetie, in the county of Wheeler and State of Texas, have invented certain new and useful Improvements in Fly-Traps; and I do hereby declare that the following is a full, clear, and exact description of the invention, which will enable others skilled in the art to which it appertains to make and use the same.

This invention relates to fly-traps.

The object is to produce a fly-trap the bait-pan of which will be operated by certain mechanism to bring it under the trap, and in such a manner that the flies will be compelled to fly into the trap, and thus be captured. Furthermore, the object is to produce a simple and effective fly-trap.

With these objects in view the invention consists in the novel construction and combination of parts of a fly-trap, as will be hereinafter fully described in the specification, illustrated in the drawings, and pointed out in the claim.

In the accompanying drawings, forming part of this specification, and in which like letters of reference indicate corresponding parts, Figure 1 is a perspective view, partly in section, showing the trap portion of the device and the mechanism for operating the bait-plate; and Fig. 2 is a vertical sectional view of the trap portion, showing the internal construction of the same.

Referring to the drawings, A designates a barrel or casing designed to hold the clock-work mechanism B for operating the bait-plate $b$.

As the clock-work mechanism employed is of the ordinary construction, I do not deem it necessary to enter into any explanation on this point—that is, to explain any of its particular parts, other than to say that it consists, essentially, of a spring, a number of pinions and gear-wheels, and an ordinary anchor-escapement.

The center arbor, $b'$, which, in an ordinary clock-work, has the hands attached to it, in this instance extends above the frame of the clock-work, and has secured at its upper end the bait-plate, as before described. This mechanism is so adjusted that it will revolve once in about every thirty seconds, so that should a fly alight upon the revolving plate it will be brought under the trap C before it will have an opportunity to satiate its hunger. This trap consists, essentially, of a semi-circular side, $C'$, to the ends $c$ of which are secured a flat side, $c'$, the under edge of which is cut away, as shown at $c^2$, through which the flies are carried under the trap, and the other portion, $c^3$, extending down to the revolving plate, so as to prevent the flies escaping. This casing is made of any suitable material—such as wire-gauze, net-work, or perforated metallic fabric. Within this casing is placed a cone-shaped piece, D, the lower ends of which are secured to the curved portion of the casing, and the inner portion being secured to the flat side $c'$. The top $d$ terminates in an opening, through which the flies pass into the receptacle formed by the curved portion and the flat side. The top of the trap is covered by means of a lid, E, which, when the said trap is to be emptied, is turned back so as to allow the contents to be emptied without any trouble.

Having described the various parts of this device, I will now explain its operation.

The bait-plate $b$ is first covered with a suitable substance, such, for instance, as sugar and water. The spring is then wound and the device started. As the plate revolves and the flies alight upon it, they will be carried under one side of the trap, and as they are brought in contact with the portion $c^3$ of the flat side they will immediately fly upward to escape being crushed, and out through the opening in the cone-shaped piece within the trap.

It will be observed that the upper edge of the barrel or casing is provided with an upwardly-extending flange, and between this and the revolving bait-plate is formed a channel, $b^2$, in which the trap rests loosely, so that should it be desirous to remove it for cleaning or emptying it of its contents, there will be no hooks or screws to unloosen for that purpose.

It will thus be seen that although this device is exceedingly simple of construction it will be found highly efficient and durable in use, and may be constructed at but a slight expense.

Having thus fully described my invention, what I claim as new, and desire to secure by Letters Patent, is—

In a fly-trap, the combination, with the base portion provided with clock-work mechanism for operating the horizontally-rotating bait-plate $b$, of the semi-cylindrical perforated or foraminated cage C, detachably connected to said base and having the recess at $e^2$ for the admission of insects to the trap, substantially as described.

In testimony that I claim the foregoing as my own I have hereunto affixed my signature in presence of two witnesses.

GEORGE WASHINGTON RUSSELL.

Witnesses:
J. H. WILLS,
V. J. LONG.